(12) United States Patent
Tumsi Dayakar et al.

(10) Patent No.: US 7,685,264 B2
(45) Date of Patent: Mar. 23, 2010

(54) SYSTEM DISPLAYING A COLLECTION OF NETWORK SETTINGS FOR A USER TO ADJUST AND ASSOCIATE THE SETTINGS WITH A NETWORK PROFILE

(75) Inventors: Kamesh C Tumsi Dayakar, Redmond, WA (US); Ravipal S Soin, Sammamish, WA (US); Tobiasz A Zielinski, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 980 days.

(21) Appl. No.: 11/215,053

(22) Filed: Aug. 30, 2005

(65) Prior Publication Data
US 2007/0079013 A1    Apr. 5, 2007

(51) Int. Cl.
*G06F 15/177* (2006.01)
(52) U.S. Cl. .................. 709/221; 709/220; 709/222
(58) Field of Classification Search .......... 709/221, 709/222, 225, 220; 455/445, 420; 370/245, 370/252; 711/154
See application file for complete search history.

(56) References Cited

U.S. PATENT DOCUMENTS

| 2003/0091015 | A1  | 5/2003  | Gassho et al. | |
|---|---|---|---|---|
| 2004/0165544 | A1  | 8/2004  | Cornett et al. | |
| 2005/0132045 | A1  | 6/2005  | Hornback, Jr. et al. | |
| 2005/0170774 | A1  | 8/2005  | Shiohara et al. | |
| 2005/0260996 | A1* | 11/2005 | Groenendaal | 455/445 |
| 2005/0283532 | A1* | 12/2005 | Kim et al. | 709/225 |
| 2006/0064555 | A1* | 3/2006  | Prahlad et al. | 711/154 |
| 2006/0203736 | A1* | 9/2006  | Molen et al. | 370/245 |
| 2006/0233114 | A1* | 10/2006 | Alam et al. | 370/252 |
| 2007/0004393 | A1* | 1/2007  | Forsberg et al. | 455/420 |

FOREIGN PATENT DOCUMENTS

WO    WO2004062231 A    7/2004

OTHER PUBLICATIONS

IBM Access Connections for Windows 2000 and XP, Lenovo Support and downloads 2005 (5 pages).
Toshiba Corporation, Toshiba Computer Systems, Toshiba ConfigFree 2005 (17 pages).
Howells, Chris: "Working Wireless: Networking with KW1F1Manager" www.linux-magazine.com [online] No. 52, Mar. 2005 (Mar. 2005), pp. 84-86 [retrieved on Apr. 7, 2009].
Keresztes, Alex and Novic, Greg: "Location X: Location Manager for Mac OS X" [online] 2002, -2003 pp. 1-20, [retrieved on Apr. 7, 2009].
Supplementary European Search Report and Opinion from EP Application No. 06 79 0094, Microsoft Corp., published May 18, 2009.
International Search Report from PCT/US2006/033821, Microsoft Corporation, published Jan. 4, 2009.

* cited by examiner

*Primary Examiner*—Le Luu
(74) *Attorney, Agent, or Firm*—Wolf, Greenfield & Sacks, P.C.

(57) ABSTRACT

Systems and methods for a readily discoverable, consolidated UI of frequently modified system settings are provided. In one aspect, systems and methods may be deployed to efficiently adjust mobile settings. In one embodiment, tiles configured to represent the an application and further having at least one icon, the status of the application, and a user-selectable display element, such as a button, for positioning within each tile are produced, wherein the user can adjust the aspect with a single input. In yet another embodiment, the user may select another user-selectable user display element to view and adjust further aspects of the application in a secondary menu. Another aspect of the invention relates to a method that may be instituted to determine which applications and/or elements of applications are to be displayed within the menus.

9 Claims, 11 Drawing Sheets

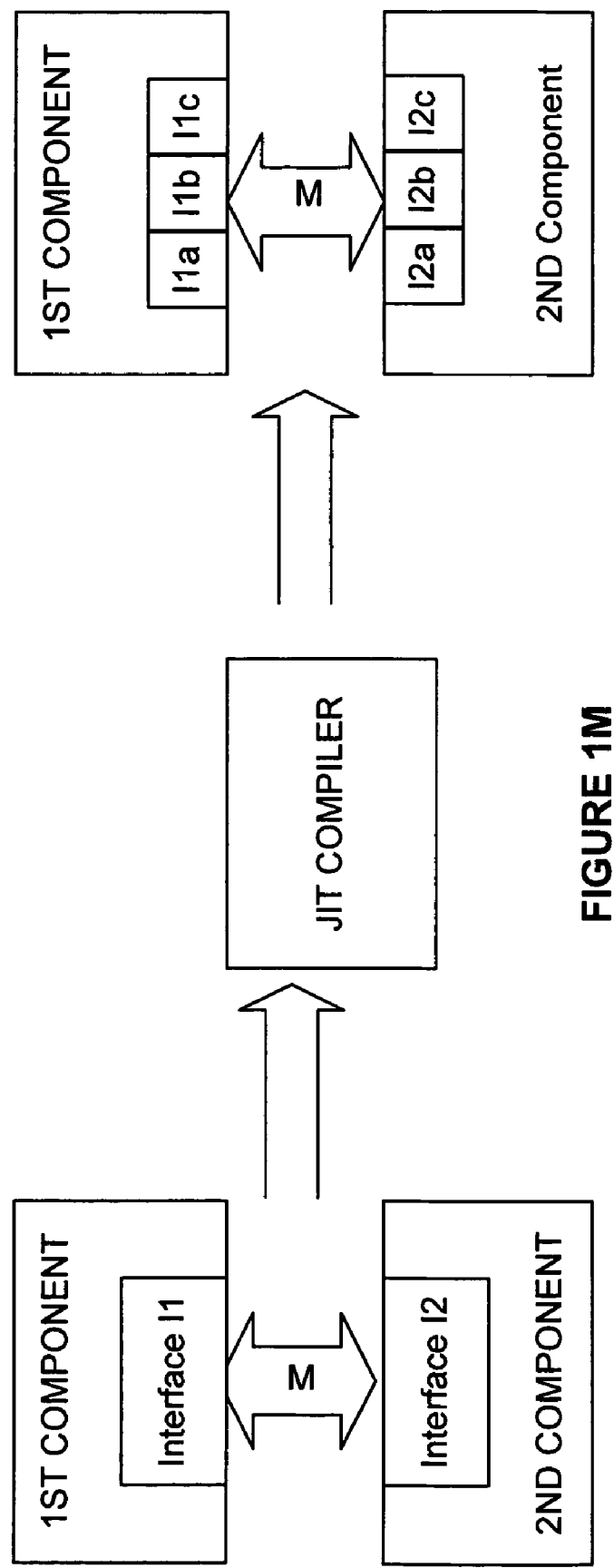

ical user interface. In one embodiment, a graphical user interface may allow the user to modify which application and which aspects of those applications are displayed on the menu. In yet another embodiment, a user may determine what network profile is applied when entering a specific location. In still yet another embodiment, a memory can update a network profile as the changes occur. In still yet further embodiments, the user may derive or otherwise create new network profiles from existing network profiles. Another aspect relates to systems and methods that allow a user to configure various settings explicitly for different network locations by means of a consolidated UI.

SYSTEM DISPLAYING A COLLECTION OF NETWORK SETTINGS FOR A USER TO ADJUST AND ASSOCIATE THE SETTINGS WITH A NETWORK PROFILE

BACKGROUND

Increasingly, mobile users move between physical locations with the same computing device. Ideally, users of these devices would prefer the machines to adapt seamlessly to those locations; but, the current systems are, for the most part, not capable of doing this. This is especially true when the user attempts to log on to different networks at these locations. Computing devices require the adjustment of numerous settings and in many systems, it relies on the user to manually adjust these settings upon moving to different locations, such as for example, to and from home, work, a client site, coffee shop, and/or an airport.

To further complicate the situation, in many computing environments the operating system and machine settings are scattered in various control panels ("CPLs") throughout the system, often in distinct and incompatible graphical user interfaces. In most instances, these settings are not in obvious and discoverable locations. For example, one software application may require the user to first execute the entire application, select an options menu and manually adjust a setting, while another may still then require the user to adjust another related setting in a central settings depot, such as Control Panel in Microsoft® Windows® operating system. Indeed, even once a user accesses Control Panel, they must still navigate through numerous options to alter the desired setting.

Not only are the required settings tedious to adjust, but a user's interests and expectations from the computing device may vary depending on the physical location of the machine. For example, a user may desire to have different desktop backgrounds or internet favorites at home than when using the same device in an office environment.

Previous attempts to solve this problem have not adequately predicted the user's location or often are not precise enough to differentiate among locations.

SUMMARY

Aspects of the invention related to systems and methods to enable users to roam between locations without requiring them to adjust their machine settings every time. In one embodiment, different machine settings may be stored in a memory for different network locations under separate network profiles. In another embodiment, these and other settings may be automatically adjusted upon entering a different location. In one such embodiment, a logical network may be employed to determine which settings are adjusted.

Another aspect relates to a graphical user interface to implement the above and other methods of adapting a computing device to different network locations. In one embodiment, a graphical user interface may allow the user to modify which application and which aspects of those applications are displayed on the menu. In yet another embodiment, a user may determine what network profile is applied when entering a specific location. In still yet another embodiment, a memory can update a network profile as the changes occur. In still yet further embodiments, the user may derive or otherwise create new network profiles from existing network profiles. Another aspect relates to systems and methods that allow a user to configure various settings explicitly for different network locations by means of a consolidated UI.

A more complete understanding of the present invention and the advantages thereof may be acquired by referring to the following description in consideration of the accompanying drawings, in which like reference numbers indicate like features, and wherein:

DETAILED DESCRIPTION

Exemplary Operating Environment

Figure 1:
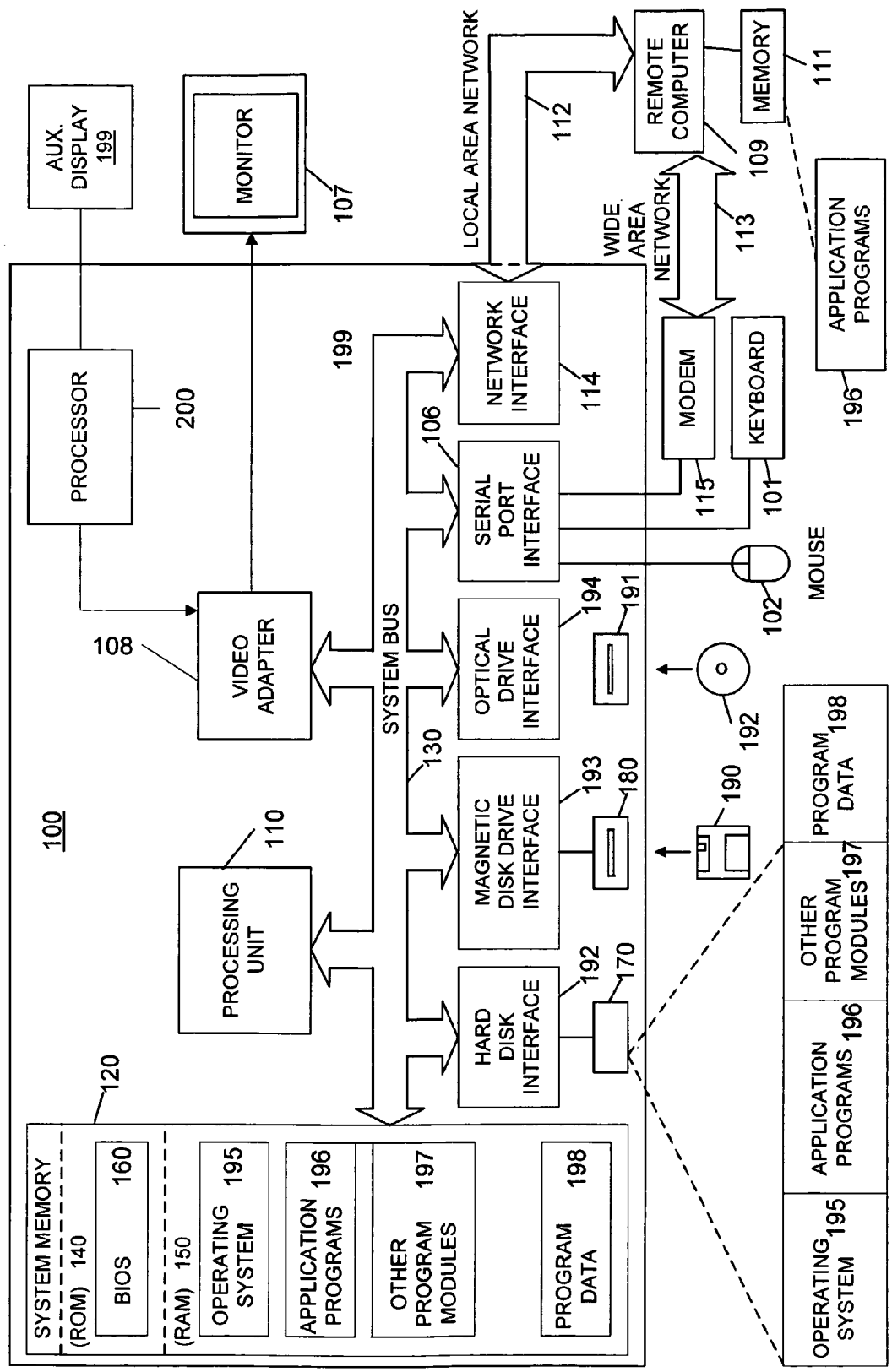
FIG. 1A illustrates a schematic diagram of a general-purpose digital computing environment in which certain aspects of the present invention may be implemented.
FIGS. 1B through 1M show a general-purpose computer environment supporting one or more aspects of the present invention

FIG. 1 is a functional block diagram of an example of a conventional general-purpose digital computing environment that can be used in connection with various embodiments of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). The illustrated computer 100 includes an optional PCMCIA interface 103 that may connect at least one embodiment of an input device according to the present invention to the computer 100. Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code.

Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
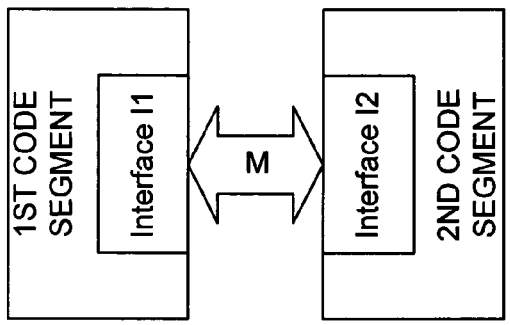
Figure 1E:
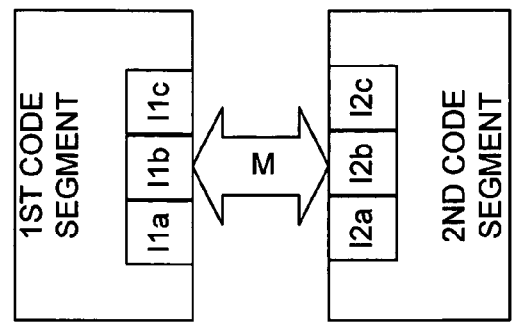
Figure 1B:
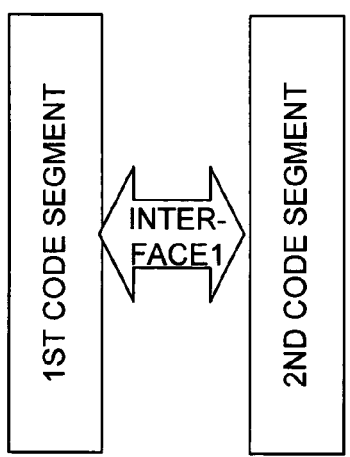

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these to are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
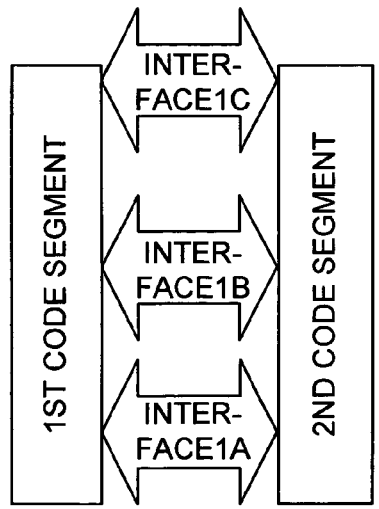

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
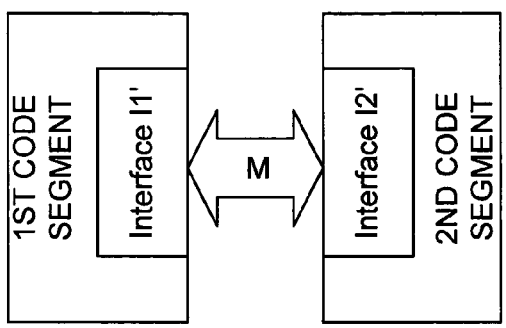
Figure 1G:
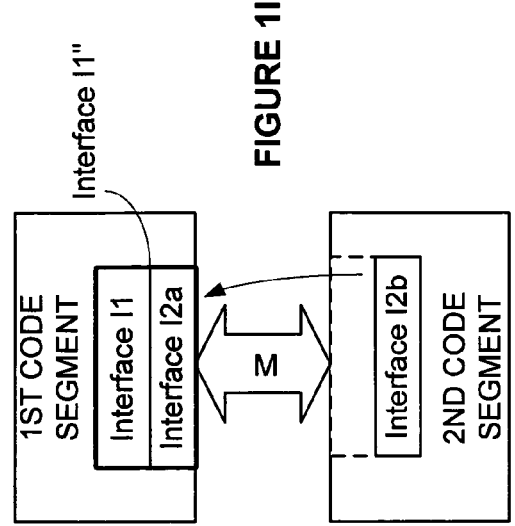

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
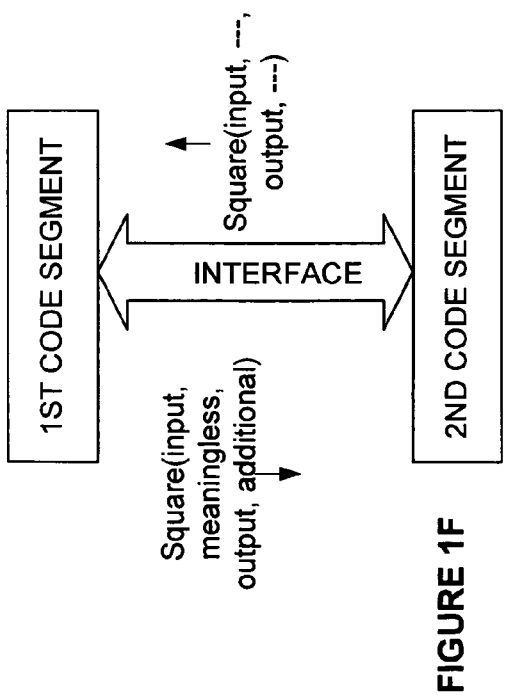
Figure 1I:
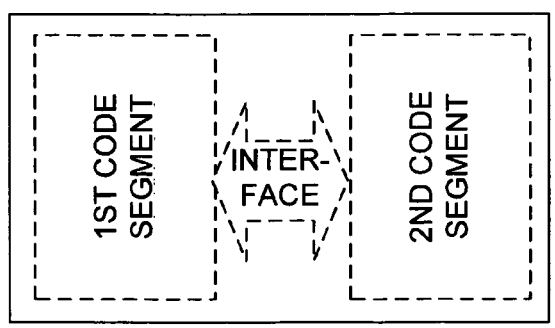

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
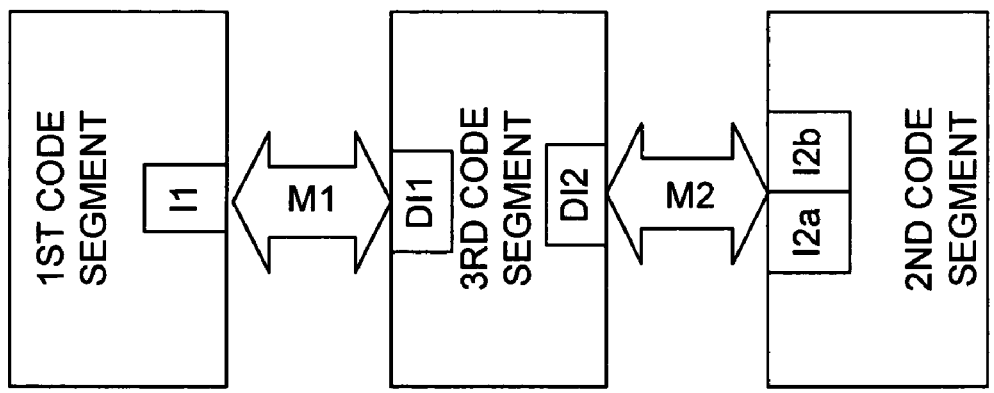
Figure 1J:
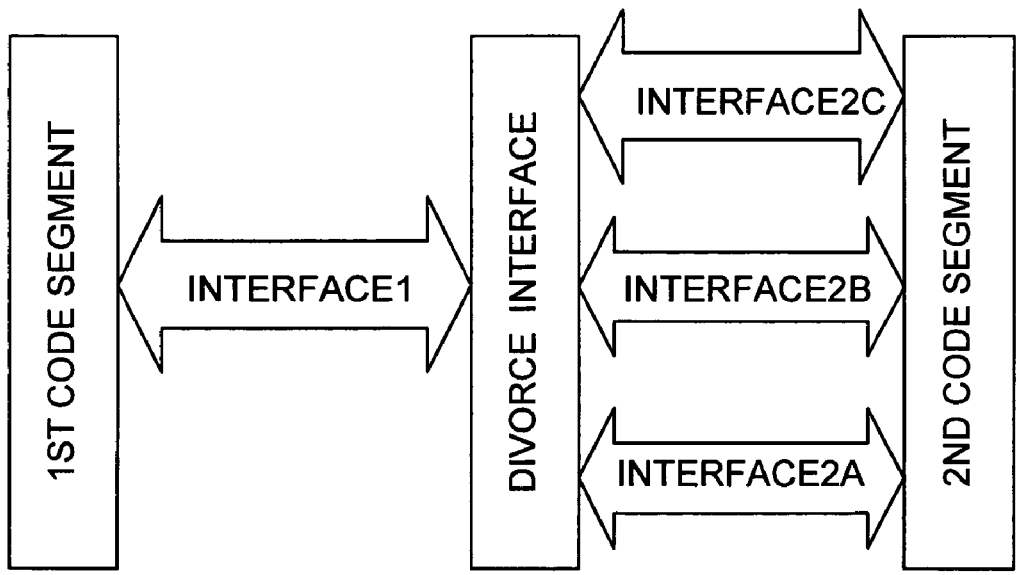

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2$a$ and I2$b$, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
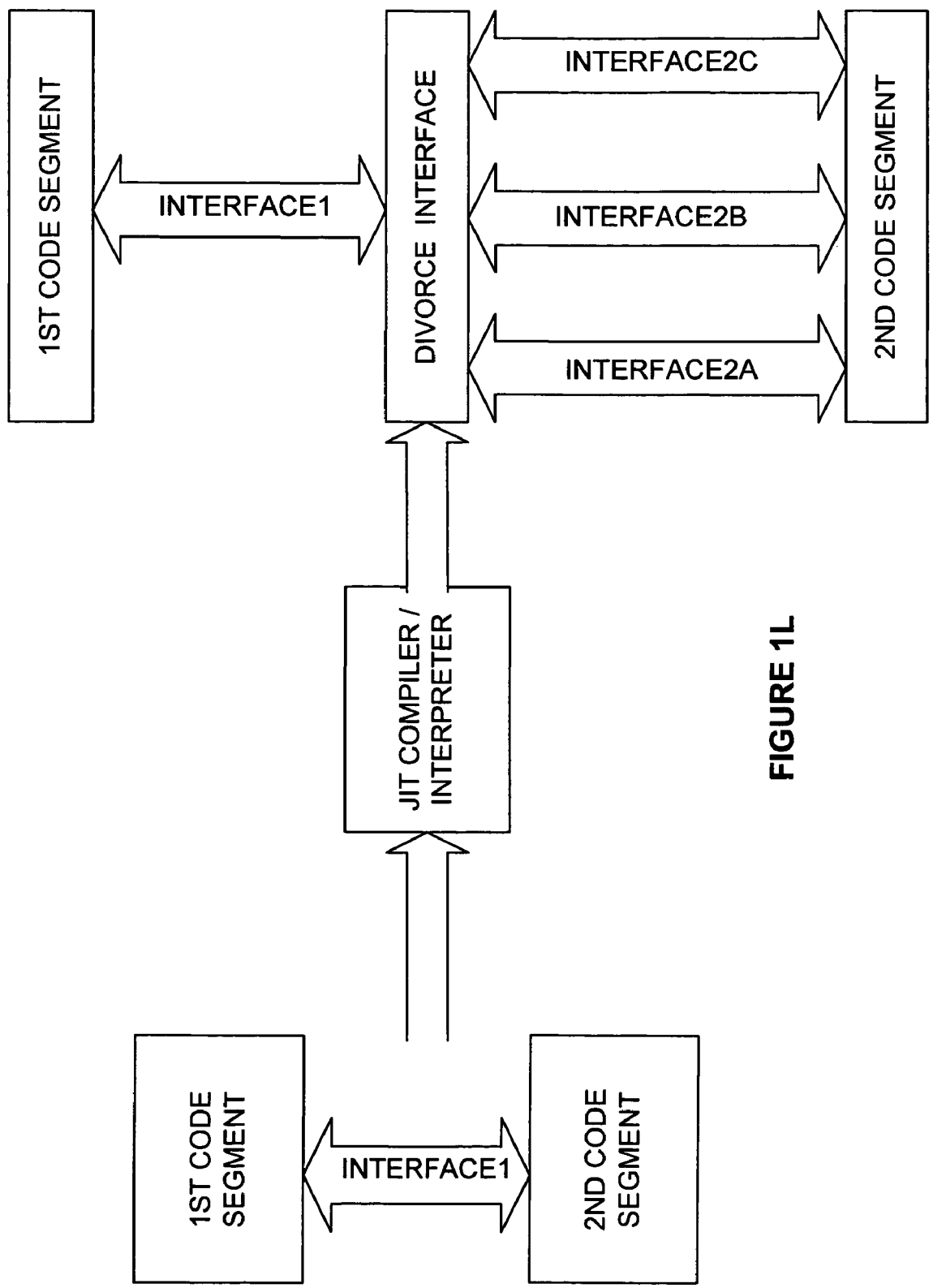

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Description of Illustrative Embodiments

Figure 2:
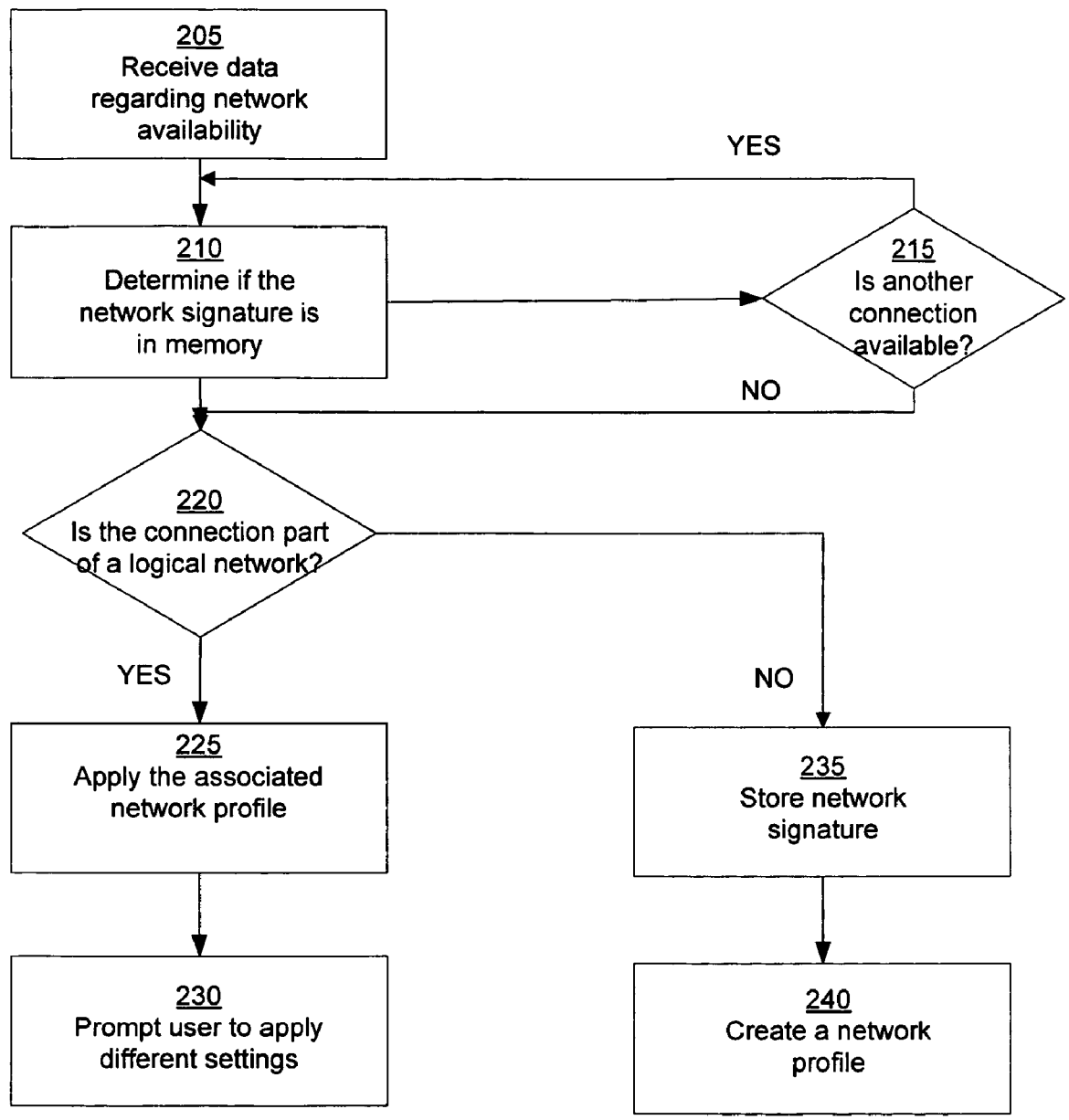
FIG. 2 shows an exemplary method of adapting a computing device to different network locations according to one embodiment of the invention.

FIG. 2 shows one exemplary method of adapting a computing device to different network locations according to one embodiment of the invention. In step 205, data is received regarding the availability of at least one network. The network may be wired or wireless. Regarding wireless networks, various forms of wireless communication are widely used for data transmission between information processing devices. One common available form of wireless communication is a wireless LAN (Local Area Network) in conformity with the IEEE 802.11 standard as well known to those skilled in the art. A common setting in communication devices that establish communication is generally required. For example, in an infrastructure wireless LAN, an SSID (Service Set Identifier) is commonly set to respective communication devices functioning as stations and access points.

In one embodiment, available networks may be determined by the receiving an SSID at the computer 100. Networks are often identified by their SSID due to the format supporting plain text, thereby allowing easy user identification of the alphanumeric label. For example, an access point, such as access point 305 (see FIG. 3a) may alert its presence by broadcasting beacon frames that transmit the SSID. Often, individual stations may passively listen for SSID beacons, however, the stations may also transmit probing signals to actively search for access points. As one skilled in the art will appreciate, the above description of SSIDs provides just one exemplary method of determining available networks. It is to be understood that wireless networks not having SSIDs are within the scope of the invention. Indeed, there are numerous methods that may allow a computer device, such as computer 100 to receive data indicating available wired or wireless networks. Indeed, in one embodiment, detection from an available network may be initiated by the connection of a peripheral device or network cabling to the computer 100.

However, returning to those networks utilizing an SSID, the SSID is more than a "name" that refers to an access point or station. Under current conventions, it is a series of 1-32 characters that is designed to uniquely identify one set of communicating wireless deices (which may also be communicating with wired devices) from other surrounding wireless devices. In this manner, the "name" or SSID permits connection between a specific station and a desired network when multiple independent networks operate in the same physical area. For example, a departmental WLAN may consist of several access points (APs) and dozens of stations, all using the same SSID. Another organization in the same building may operate its own departmental WLAN, composed of APs and stations using a different SSID. The purpose of SSID is to help stations in the first department find and connect to APs in that department, ignoring APs belonging to the other department.

Figure 3A:
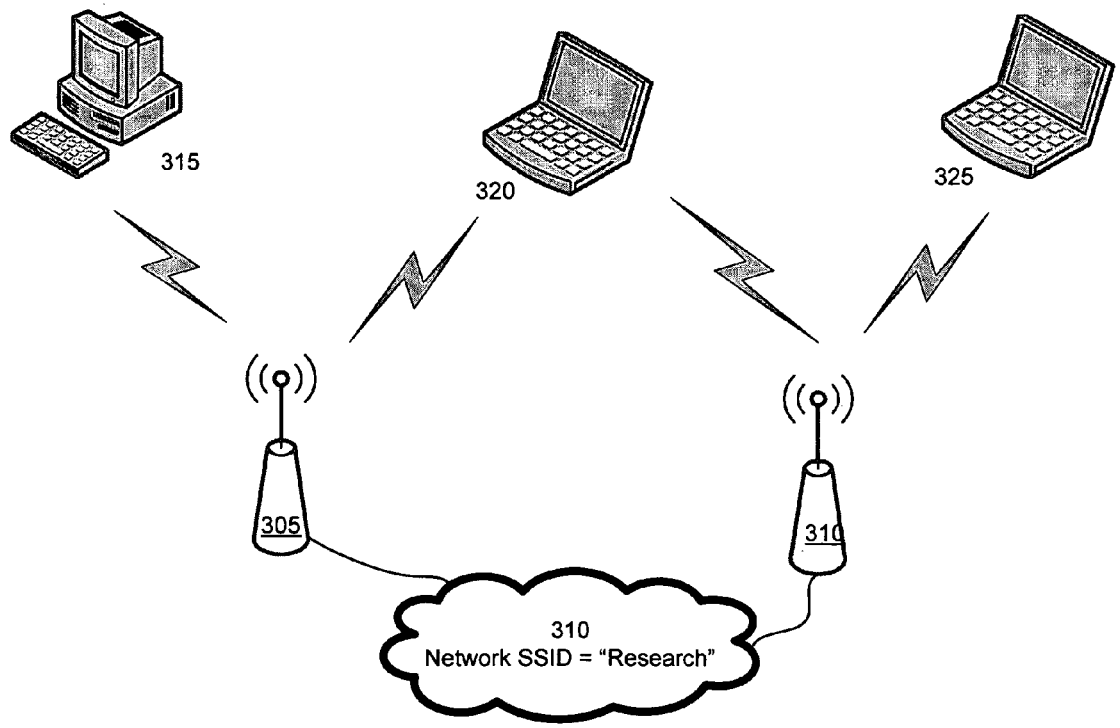
FIGS. 3a and 3b illustrate networking environments utilizing the SSID protocol.
Figure 3A:
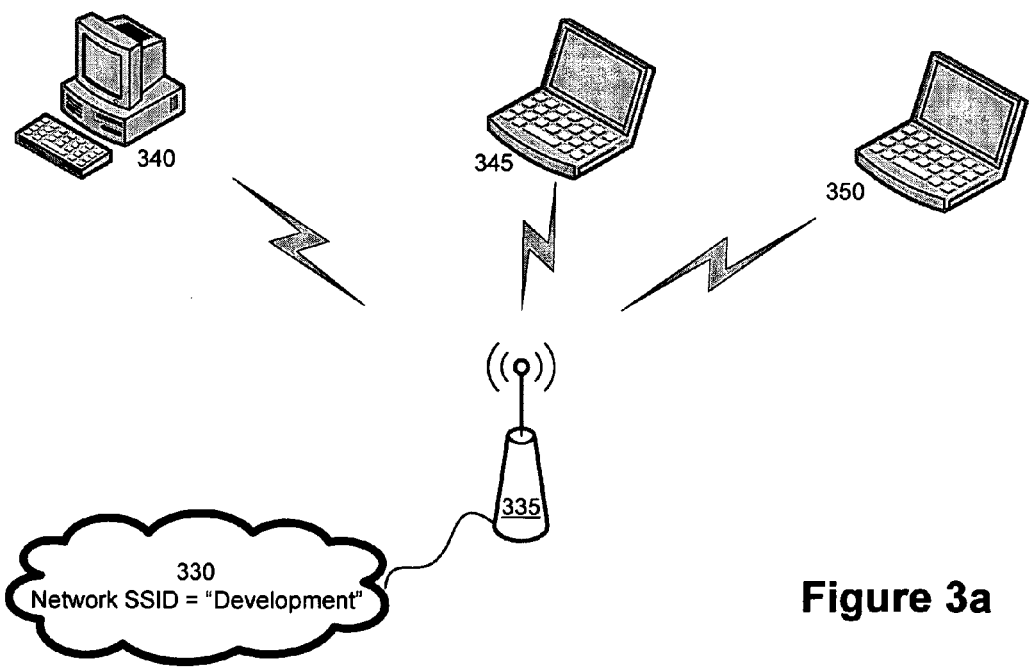

For this and other reasons, select embodiments of the present invention do not use the SSID as the sole mechanism to associate settings to a network. FIG. 3a illustrates a networking environment in which a first departmental WLAN 300 may consist of several access points (305, 310) and a plurality of stations (315, 320, 325), all using the same SSID ("Research") to communicate. A brief description of the figure will readily demonstrate why utilizing the SSID alone to associate settings is inconvenient, inaccurate and inefficient. Another department within the same organization may operate its own departmental WLAN, composed of APs and stations using a different SSID ("Development"). In the illustrated example, WLAN 330 consists of access point 335 and stations 340, 345, and 350. Therefore, the Research SSID allows stations 315, 320, and 325 in the research department to find and connect to APs 305 and 310 within the department while ignoring AP 335 belonging to the Development department. In joint projects, the Research and Development departments would want to share resources and applications. As one skilled in the art can readily appreciate, it would be inconvenient to associate computer settings according to the SSID.

Figure 3B:
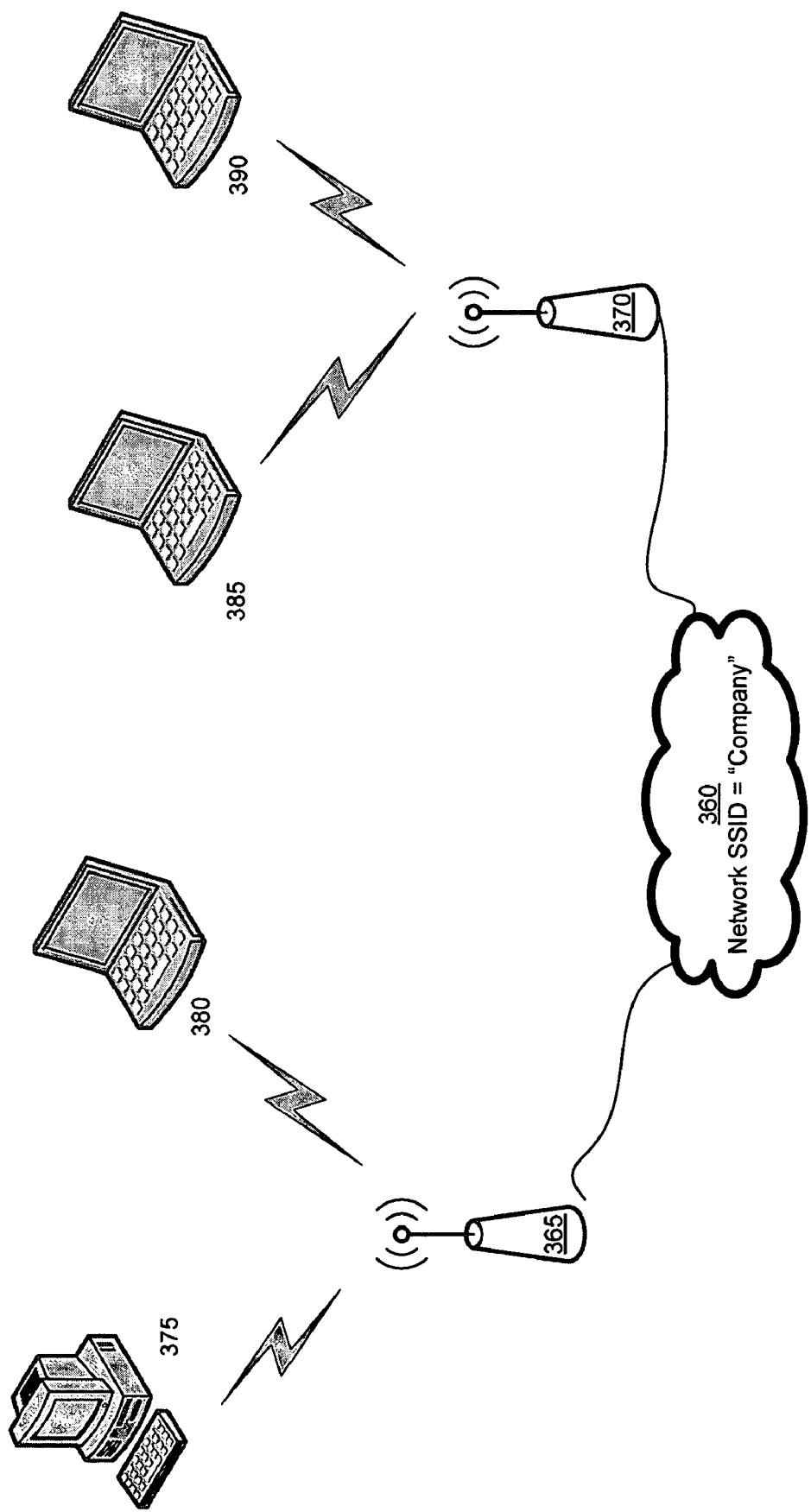

FIG. 3b illustrates another networking environment using the SSID protocol. In the exemplary environment, a company wide WLAN 360 has the SSID of "Company" and consists of access points 365 and 370, wherein access point 365 is in communication with stations 375 and 380 and access point 370 is in communication with stations 385 and 390. If stations 375 and 380 are utilized by the Legal department and stations 385 and 390 are utilized by the Human Resources department, the company would not want to associate computer settings according to the single SSID. Doing so would cause inconvenience to both departments and possible result in the improper disclosure of confidential documents. For this and other reasons, it would be more desirable to utilize a network signature to properly associate settings to a network. As used herein a network signature may encompass any collection of network-related parameters, wherein SSID is not the only parameter considered. One exemplary network signature and the use thereof is described below.

In step 210 it is determined if a network signature is stored within a memory. The memory may be any computer readable medium such as a local fixed drive, such as drive 170, or accessed remotely through a network, such as network adapter 114.

Figure 4:
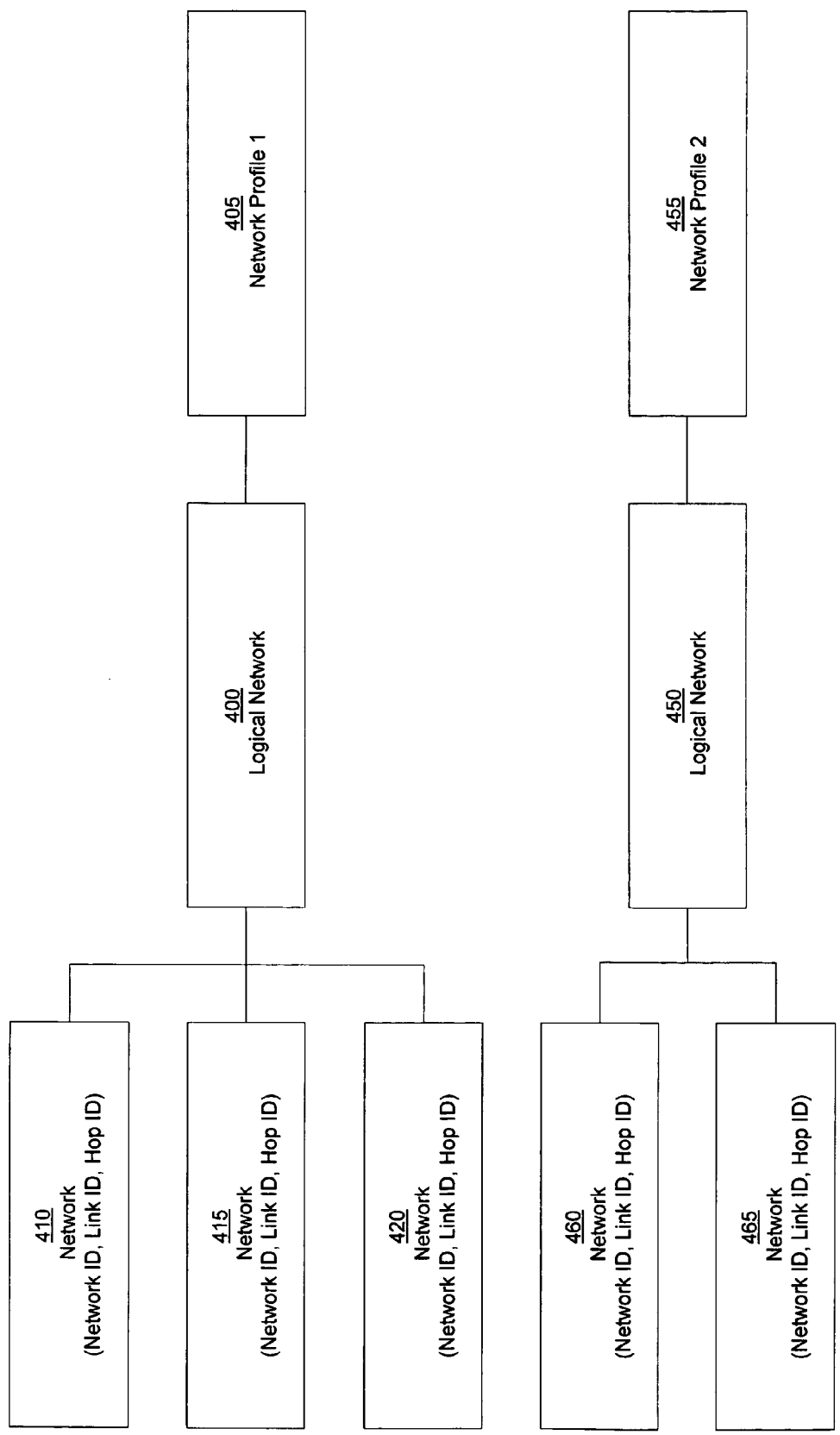
FIG. 4 shows network connections organized in logical networks according to one embodiment of the present invention.

FIG. 4 shows one embodiment of possible logical networks according different aspects of the present invention. The figure shows two logical networks, networks 400 and 450, each being associated with a network profile. (profiles 405 and 455, respectively). As used herein, a network profile is a collection of computer settings that are associated with at least one logical network.

As readily seen in FIG. 4, logical network 400 comprises networks 410, 415, and 420. Each of the networks has a network signature to allow unique identification of each of the individual networks. For example, networks 410, 415, and 420 each have a Network ID, Link ID, and a Hop ID that may be used to determine the network signature. The Network ID may be, for example, the domain of the network, and utilize the DNS suffix. The Link ID may represent the subnet of the network to which the station(s) are connected. For example, the MAC address of the default gateway (NAT in other embodiments) may be used as the Link ID. The Hop ID may represent the point of entry onto the network. As one skilled in the art will appreciate, the point of entry may be a NAT, access point, ICS computer, cell tower modem, switch, bridge, hub, among others known in the art. For example, in the above WLAN of FIG. 3*b*, the SSID may serve as the Hop ID. Networks 460 and 465 are associated with logical network 450. As seen in the figure, logical network 450 has "Network Profile 2" (455), which is distinct and separate from "Network Profile 1" (405), which correlates to logical network 400. While the profiles are separate and distinct, one skilled in the art will realize there may be one or more common features and/or settings. For example, the default printer in both profiles may be the same.

In optional step 215, it can be determined if more than one network connection is available. In one embodiment, upon the finding of more connections being available, step 210 may be repeated, wherein it will be determined if the network signature is available. As shown in the illustrative embodiment in FIG. 2, if no additional networks are available, step 220 may be implemented (discussed below). As one skilled in the art will appreciate, this step may occur at different times in the process and indeed be repeated throughout the process in accordance with one embodiment of the invention. If more than one network connection is available, wherein at least two of them are associated with different profiles the computer may prioritize the profile to be applied based on prioritizing data. The prioritizing data may be based upon a myriad of factors known to those skilled in the art and in select embodiments, it may be adjusted by the user through a graphical user interface.

In step 220, it is determined whether at least one available network connection is part of a logical network in a memory. As discussed above, the memory may be any computer-readable medium configured to store data. If the network connection is part of a logical network that has associated settings stored in a memory, network data configured to associate at least one setting with the available network connection is generated This data may be used by the computer to apply that particular "logical setting" (the associated network profile; see step 225). In one embodiment, the settings may be automatically applied and require no further input from the user. Yet in other embodiments, the user may be prompted to which associated settings should be applied. An additional step may be implemented, that allows a user to apply different settings (see, e.g., step 230). In one embodiment, a graphical user interface may be implemented that aids the user in selecting which logical network to associate a network connection with. In yet another embodiment, the user may be permitted to create a new logical network with an associated network profile. Still, in further embodiments, the user may be permitted to split existing profiles into multiple profiles or combine multiple different profiles into a single profile. Indeed, in at least one embodiment, network profiles may be pre-set by an OEM or third-party and do not require selection by the end-user. In one such an embodiment, a GUI may not utilized, but rather the settings will automatically be created and applied without user configuration. However, in one such embodiment having automatic pre-set profiles, a GUI may be supplied to the user to combine or divide the profiles to fit his/her needs, but will not need to configure or otherwise select a profile setting to take advantage of the disclosed aspects of the invention.

In one embodiment, if the network connection is not part of a logical network stored in a memory, the network signature may be stored in a memory (Step 235). Upon storing the network signature in a memory, a graphical user interface may allow a user to select a logical network to associate the network connection with. Alternatively, a graphical user interface may be implemented to allow a user to create a new logical network with an associated network profile (step 240).

Figure 5:
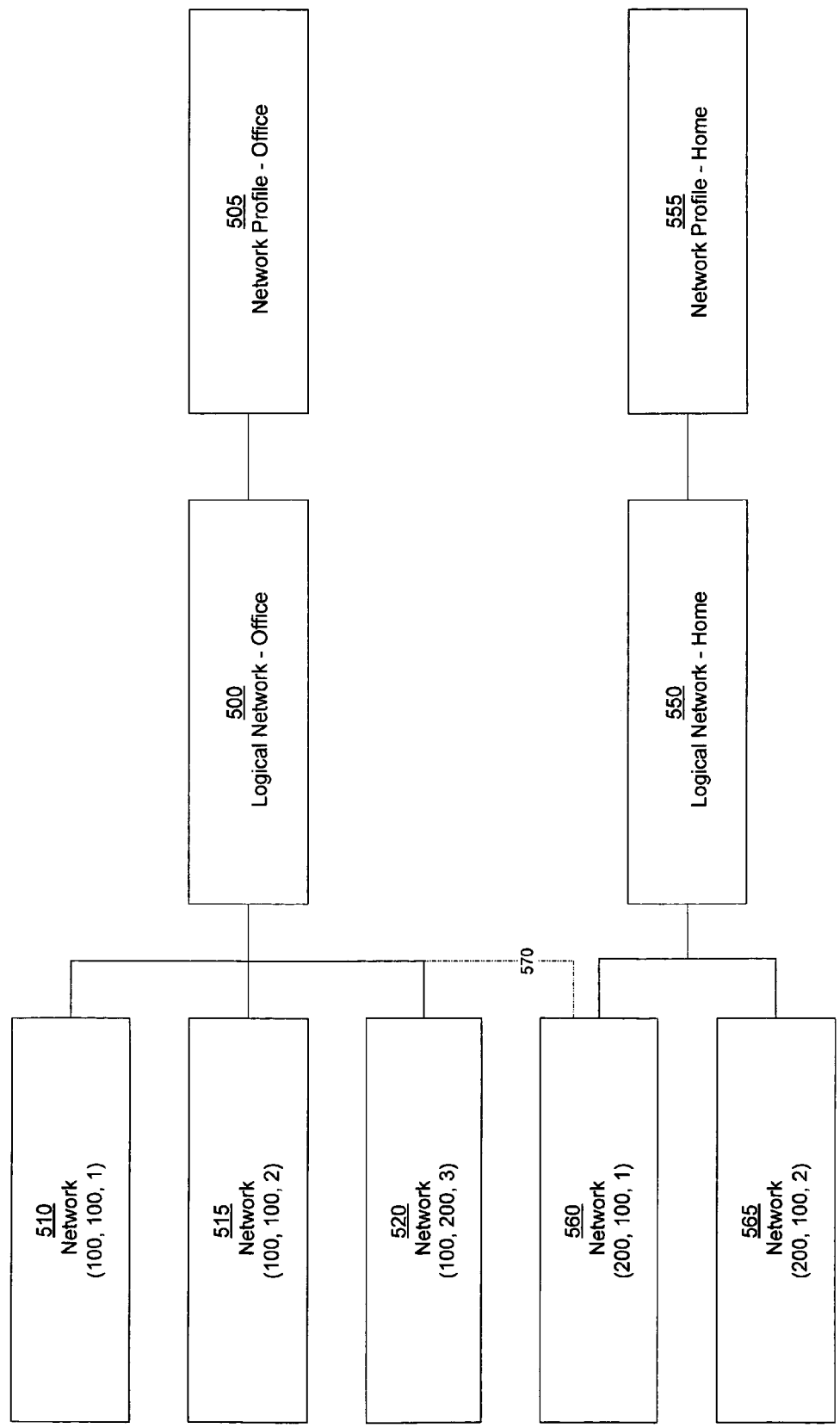
FIG. 5 shows network connections organized in logical networks according to yet another embodiment of the present invention.

FIG. 5 shows one illustrative example of a collection of network connections associated with logical networks. As seen in the figure, three networks (510, 515, and 520) are associated with logical network 500, which may be for example, in an office setting. Network 510 having a Network ID="100", Link ID="100" and a Hop ID="1" may be the users desktop computer in the office environment or a location where the user is frequently present. As one skilled in the art will appreciate the values are hypothetical to demonstrate to the reader one embodiment of the invention and are not intended to represent one format or restrict the invention to any particular formatting.

Network 515 has the same Network ID and Link ID as network 510 but has a different Hop ID (value="2"). If the network profile (505) was merely bases on the Hop ID, for example, the SSID, a different profile may have to be loaded or otherwise programmed.

Therefore, it is more efficient and accurate to utilize more parameters than detection of an SSID when adjusting settings.

Returning to network 515, the connection may represent another location within the same office environment as connection 510, such as for example, a conference room, where the access point of entry onto the network may differ but the user prefers to keep the same profile. For example, the default printer, background, bookmarks, and collection of recently opened documents, to name a few settings, may be desired to be identical to when the user is logged on network 510.

Network 520 has the same Network ID as networks 510 and 515, but has an entirely different Link ID (value="200") and Hop ID (value="3"). Network 520 may be a network available in another building or division within the company. For example, it is not uncommon for corporations and other business entities to be arranged in a campus-type layout having numerous buildings in close proximity. Although the access point and gateway are different, the user may still want to have the same profile as used when accessing network services through networks 510 and 515.

As readily seen in FIG. 5, network connections 560 and 565 are associated with logical network 550 and only differ in their Hop ID. For example, one connection may use a 100 mbs wired connection to the network, while the other may use a wireless access point to access the network services. In either case, the user may wish to use the settings set forth in Network Profile—Home (555). In one embodiment, the profile settings set forth in profile 555 will automatically be adjusted when the user utilizes connections 560 and/or 565. In one embodiment, the profile may then be automatically adjusted to profile 505 once the user no longer utilizes connections 560 and/or 565.

As any mobile computer user knows, it is often sometimes desirable have the same network profile at the home as the office. This is especially true for telecommuters. For example, network 560 may be a home office connection, wherein the user desires to keep network profile 505 ("Network Profile—Office"). In systems that merely utilize the access point or SSID to identify the profile, this would not be possible or at the very least inconvenient or impractical. As dotted line 570 indicates, the user may associate network 550 with logical network 500. In one embodiment, the user may elect to be prompted to determine which logical network to associate with. In still yet embodiment, if the user elects to be associated with logical network 500 which subsequently becomes unavailable, the user computer may automatically switch to become associated with logical network 550. Yet in other embodiments, the user may be alerted to the unavailability of services or components within the network profile and manually select and adjust settings as desired.

Another aspect relates to systems and methods that allow a user to configure various settings explicitly for different network locations by means of a consolidated UI. The user interface may display a collection of settings that may be adjusted by the user. By the use of the term "setting", it is to be understood that any aspect of an application that may be altered, manipulated, or otherwise processed by the computer system may be a setting. For example, within an internet browser, such as Microsoft® Internet Explorer®, possible settings that could be adjusted in a network profile may include: changing the bookmarks or home page, or adjusting the proxy server. Indeed, it is conceivable that the default browser itself may be different among profiles. System settings may also be adjusted based on the network profile. For example, power settings, display brightness, the password required for logging on one ore more programs may be adjusted. In yet other embodiments, the applications available on the start menu or task bar may be adjusted.

As one in the art will readily appreciate, a plurality of settings and application states may be readily adjusted based upon the network connection(s) utilized by the user, wherein a user may customize the user experience. For example, one or more of the following examples may be automatically adjusted upon connecting to a network: the most frequently utilized applications when the user is connected to that particular network, the most recent files or documents accessed by the user when connected to the particular network, different desktop features and settings for each connection, and customizable and quick launch and start menu applications available to the user. Indeed, these provide only a exemplary listing of possible settings that may be adjusted to provide a customizable user experience. Any settings that may be adjusted and applied upon connecting to a different network is within the scope of the invention.

In one embodiment of the invention, the executing instructions for adjusting the setting(s) are associated with a user-selectable display element, such as for usage with a graphical user interface. In such an embodiment, a menu comprising a collection of settings may be displayed to a user, such as through monitor 107, wherein at least one of the settings is associated with a first user selectable display element. The user-selectable display element may be a button, toggle, check-box, or slidable scale, or indeed any mechanism capable of being displayed to a user and adjusted to affect the state of the aspect or entire application.

The menu may be configured so that upon receiving a selection signal indicative of a user interface selection device, such as a mouse input or keyboard stroke, correlating to selection of a user selectable display element, the state of at least one aspect of an application is adjusted for at least one network profile. One skilled in the art will understand that while the term "mouse" was used to exemplify a user interface selection device, a mouse input may be received from any input device that controls movement of a cursor or other mechanism and allows selection of functions on a computer system device. As used herein, the term "mouse" can encompass a wide variety of input devices that provide an input to a computing device, including, but not limited to: "track pads", "track balls", "scrollers", "joy sticks", "soft buttons" "mouse-pens", "light pens" and other positioning or pointing systems. Moreover, while numerous embodiments may comprise a rotatable ball to provide movement, the present invention is not limited thereto. It will be appreciated by those in the art that various mouse movement sensing system alternatives are well known and available, such as mice with optical sensors for sensing mouse movements. Moreover, as described above, the present invention is not limited to a mouse-type input device, but rather is may be utilized with a vast array of input devices for a computer system.

In still yet further embodiments, resources not available to the user at the current location will not be displayed. For example, if the user only has access to a word processing application, such as Microsoft® Word® when connected to a work related network, such as network connection 510, and cannot utilize the application when connected to other unrelated networks, the computer will not display that application to the user. While the above example illustrates one embodiment with a software application, one skilled in the art will realize any application; including hardware applications (such as showing available printers, media servers or other network appliances) may also be implemented. Indeed, any resources, whether hardware or software, is within the scope of the invention. For example, in one embodiment, the available file shares available to the user may only displayed to the user when those resources are available from that network connection. Indeed, in one embodiment, the profile may be configured to have the ability to launch a set of programs automatically based on different network profiles. For example, looking to FIG. 5, upon logging in at network connection 565, the settings for Network Profile—Home (555) are utilized. One of the settings may automatically launch a messenger service, such as MSN Messenger®. If the user's work does not allow such messenger systems to be utilized, the user can set the office network profile (505) to not load the messenger service, load another messenger service, or sign in under a different user name.

In other embodiments, the computer may query available resources and automatically store settings as the user changes them or as they become unavailable. In yet other embodiments a UI may be provided to allow a user to derive or create new network profiles from existing network profiles. This may be useful when users want to blend settings from a home network and an office network. For example, the user may want to use the home's default printer, but retain other settings from the work networking environment. In such a case, the user may derive the network settings from one or both of the logical networks and create a new logical network that is associated with a different profile.

The present invention has been described in terms of exemplary embodiments. Numerous other embodiments, modifications and variations within the scope and spirit of the appended claims will occur to persons of ordinary skill in the art from a review of this disclosure.

We claim:

1. In a computer system having a graphical end user interface including a display and an end user interface selection device, a method of adapting a computer to different networking locations comprising the steps of:
    (a) displaying on the display a collection of settings and at least one selectable display element for adjusting at least one of the settings;
    (b) receiving a selection signal indicative of a selection of the at least one of the selectable display element through the end-user interface selection device, and based upon the selection signal, storing the selection in a memory;
    (c) associating the at least one stored setting of (b) with a network profile of a logical network;
    (d) receiving a network signature of at least one available network connection, the network signature including a collection of network-related parameters comprising at least two different network identifiers;
    (e) determining if the network signature of the at least one available network connection is stored in the memory;
    (f) upon determining the network signature of the at least one available network connection is not stored in the memory in (e), displaying on the display device a collection of settings and at least one selectable display element for adjustment of at least one of the settings, each setting being an aspect of an application to be executed on the computer system or an aspect of the computer system; and
    (g) allowing adjustment of the settings and association of the settings with a network profile.

2. The computer system of claim 1, wherein at least two network connections are available which are associated with a different logical network, the computer executable instructions further comprise the steps of:
    (f) displaying on the display information providing a notification of the at least two available network connections in conjunction with at least one selectable display element for selection of at least one of the networks, and
    (g) receiving a selection signal indicative of a selection of the at least one of the selectable display elements through the end-user selection interface device and based upon the selection signal, loading the network profile associated with the logical network for which the selected network connection belongs to.

3. The computer system of claim 1, wherein the computer executable instructions further comprise the step of: (f) upon determining the network signature of the at least one available network connection is stored in the memory in (e), automatically applying the settings in the associated network profile.

4. The computer system of claim 1, wherein the collection of network parameters comprises at least three network identifiers.

5. The computer system of claim 1, wherein one of the network identifiers comprises a service set identifier (SSID).

6. A computer having a processor, display and a computer readable medium, the computer readable medium comprising instructions that when executed by the processor allows an end-user of the computer to change settings of the computer based on a network connection, the instructions comprising:
    (a) receiving data regarding the availability of at least one network connection in the memory;
    (b) for at least one available network connection, determining if a network signature including a collection of network-related parameters comprising at least two different network identifiers is stored within the memory;
    (c) for at least one network connection determined to have a network signature in (b), loading at least one associated network profile;
    (d) receiving data regarding available resources to an end user on the computer;
    (e) based upon the data received in (d), permitting only the available resources to be displayed on the display;
    (g) upon determining the network signature of the at least one available network connection is not stored in the memory in (b), displaying on the display device a collection of settings and at least one end user-selectable display element for adjusting at least one of the settings; and
    (h) allowing adjustment of the settings and association of the settings with a network profile.

7. The computer system of claim 6, wherein at least two network connections are available which are associated with a different logical network, the computer executable instructions further comprise the step of:
    (f) determining through prioritizing data at least one network profile to be loaded into the memory.

8. The computer system of claim 6, wherein the computer executable instructions further comprise the step of:
    (f) determining that at least one of the available networks of (a) is no longer available.

9. The computer system of claim 6, wherein the network profile is created by an end-user in (h).

* * * * *